(12) United States Patent
Sankaralingam et al.

(10) Patent No.: US 11,513,805 B2
(45) Date of Patent: Nov. 29, 2022

(54) COMPUTER ARCHITECTURE WITH SYNERGISTIC HETEROGENEOUS PROCESSORS

(71) Applicant: Wisconsin Alumni Research Foundation, Madison, WI (US)

(72) Inventors: Karthikeyan Sankaralingam, Madison, WI (US); Anthony Nowatzki, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 769 days.

(21) Appl. No.: 15/241,488

(22) Filed: Aug. 19, 2016

(65) Prior Publication Data

US 2018/0052693 A1 Feb. 22, 2018

(51) Int. Cl.
*G06F 9/38* (2018.01)
*G06F 15/80* (2006.01)
*G06F 12/084* (2016.01)
*G06F 9/50* (2006.01)

(52) U.S. Cl.
CPC .......... *G06F 9/3887* (2013.01); *G06F 9/3855* (2013.01); *G06F 9/5044* (2013.01); *G06F 12/084* (2013.01); *G06F 15/8007* (2013.01); *G06F 2212/62* (2013.01); *Y02D 10/00* (2018.01)

(58) Field of Classification Search
CPC .. G06F 9/45516; G06F 9/4881; G06F 9/5044; G06F 9/3887; G06F 12/084; G06F 15/8007; G06F 9/3855; G06F 2212/62; Y02D 10/22

USPC ............................................................ 712/22
See application file for complete search history.

(56) References Cited

U.S. PATENT DOCUMENTS

| | | | |
|---|---|---|---|
| 6,658,539 B2* | 12/2003 | Arimilli | G06F 12/0831 711/141 |
| 8,225,297 B2* | 7/2012 | Gray | G06F 12/084 711/145 |
| 2004/0225870 A1* | 11/2004 | Srinivasan | G06F 9/3842 712/235 |
| 2007/0033592 A1* | 2/2007 | Roediger | G06F 9/4881 718/102 |
| 2008/0250414 A1 | 10/2008 | Brokenshire et al. | |
| 2008/0282064 A1 | 11/2008 | Day et al. | |
| 2009/0172363 A1* | 7/2009 | Orenstien | G06F 9/30036 712/225 |
| 2011/0067029 A1 | 3/2011 | Wolfe et al. | |
| 2011/0161586 A1* | 6/2011 | Potkonjak | G06F 12/084 711/122 |
| 2013/0160016 A1 | 6/2013 | Gummaraju et al. | |
| 2013/0166886 A1* | 6/2013 | Sasanka | G06F 9/30098 712/216 |

(Continued)

OTHER PUBLICATIONS

International Search Report for Application No. PCT/US2017/045702; dated Nov. 8, 2017.

(Continued)

*Primary Examiner* — Shawn Doman
(74) *Attorney, Agent, or Firm* — Boyle Fredrickson, S.C.

(57) ABSTRACT

A computer architecture employs multiple special-purpose processors having different affinities for program execution to execute substantial portions of general-purpose programs to provide improved performance with respect to a general-purpose processor executing the general-purpose program alone.

19 Claims, 3 Drawing Sheets

(56) References Cited

U.S. PATENT DOCUMENTS

| | | | |
|---|---|---|---|
| 2014/0013020 A1 | 1/2014 | Horsnell et al. | |
| 2014/0189704 A1* | 7/2014 | Narvaez | G06F 9/5094 |
| | | | 718/104 |
| 2015/0007196 A1* | 1/2015 | Toll | G06F 9/5083 |
| | | | 718/105 |
| 2015/0081980 A1* | 3/2015 | Walker | G06F 11/073 |
| | | | 711/135 |
| 2016/0004570 A1* | 1/2016 | Koh | G06F 9/5044 |
| | | | 718/104 |
| 2016/0349828 A1* | 12/2016 | Weissmann | G06F 1/3287 |
| 2016/0371081 A1* | 12/2016 | Powers | G06F 9/45504 |
| 2017/0109210 A1* | 4/2017 | Goossens | G06F 8/44 |

OTHER PUBLICATIONS

Tony Nowatzki et al.; "Analyzing Behavior Specialized Acceleration." In Proceedings of the Twenty-First International Conference on Architectural Support for Programming Languages and Operating Systems, pp. 697-711. ACM, 2016. US.

Nathan Goulding-Hotta et al. "The GreenDroid Mobile Application Processor: An Architecture for Silicon's Dark Future." IEEE Micro 31, No. 2 (2011): pp. 86-95, US.

* cited by examiner

COMPUTER ARCHITECTURE WITH SYNERGISTIC HETEROGENEOUS PROCESSORS

STATEMENT REGARDING FEDERALLY SPONSORED RESEARCH OR DEVELOPMENT

This invention was made with government support under CCF0917238 and CNS1218432 awarded by the National Science Foundation. The government has certain rights in the invention.

CROSS REFERENCE TO RELATED APPLICATION

Background of the Invention

The present invention relates to a computer architecture having multiple, highly specialized processors and in particular to an architecture capable of switching operating modes based on anticipated program behavior.

General-purpose processors, such as out-of-order processors providing speculative execution, are designed to efficiently execute a wide range of computer programs. It is known, however, that improved performance can be obtained in particular program domains or with particular program behaviors using specialized computer processors. For example, "single instruction multiple data" or SIMD processors have been developed for programs that require rapid execution of a common instruction on multiple data elements. Such SIMD processors are beneficial in the domain of graphics processing, for example, where in an adjustment of the brightness of an image, multiple data elements of pixels in the image are all scaled by a common factor. Similarly, specialized neural network processors can provide improved performance in machine learning or pattern recognition applications.

The improved performance, measured in energy consumption and/or speed, provided by these specialized processors normally disappears as these processors are required to execute a general-purpose program having a variety of behaviors and/or spanning different program domains. For this reason, specialized processors are normally paired and work under the control of a general-purpose processor. In this situation, the general-purpose processor may execute the program until the specialized processor is invoked through special commands or instructions embedded in the executed program, for example, instructions accessing an application programmer interface (API) associated with the specialized processor.

SUMMARY OF THE INVENTION

The present inventors have recognized that a properly selected group of specialized processors can operate synergistically to provide improved performance (speed and/or energy efficiency) over a wide range of general-purpose programs. Importantly, the appropriate set of specialized processors can provide complementary "affinities" that cover a significant percentage of the instructions of a general-purpose program. As a result, the general-purpose processor can be simplified, providing a net savings in integrated circuit area or complexity.

In one embodiment, the complexity of partitioning a program among multiple specialized processors having different affinities is handled through a run time profiling process permitting program allocation to be largely transparent to the user/programmer.

In a simulation across a wide range of benchmarks, a 2-wide OOO processor with three special-purpose processors selected per the present invention was able to match the performance of a conventional 6-wide OOO processor while using 40 percent lower chip area and being 2.6 times more energy efficient.

Specifically, in one embodiment, the invention provides a computer architecture employing a set of heterogeneous processors providing relatively different performances with respect to portions of a program having different degrees of data parallelism. The heterogeneous processors are controlled by a switch unit alternately switching between the heterogeneous processors for different portions of the program based on the assessed degree of data parallelism. The heterogeneous processors include: (a) a general-purpose processor providing speculative execution; (b) at least one processor providing higher performance execution than the general-purpose out-of-order processor for first given program portions exhibiting a predetermined level of data parallelism; and (c) at least one processor providing higher performance execution than the general-purpose out-of-order processor for second given program portions exhibiting less data parallelism than the predetermined level of data parallelism.

In some embodiments, the program may have different degrees of control flow complexity and the heterogeneous processors may further include: (d) at least one processor providing higher performance execution than the general-purpose out-of-order processor for third given program portions having lower control flow complexity than the first given program portions.

In some embodiments, the program may have different degrees of control bias and the heterogeneous processors may further include: (e) at least one processor providing higher performance execution than the general-purpose out-of-order processor for fourth given program portions having more biased control flow than the second given program portions.

It is thus a feature of at least one embodiment of the invention to identify specialized processors that can be synergistically combined to improve processor performance under the parameters of execution speed, energy consumption, and chip area. The present inventors have determined that the proper combination of multiple specialized processors significantly shifts the performance frontier to higher performance without the need for greater chip area.

In some embodiments, the invention may use a combination of program analysis and profiling data from a previous execution of the program to predict which of the heterogeneous processors will have the most performance. Based on these predictions, the decisions of which processor to execute on may be statically determined and encoded into the program binary.

In one embodiment, the invention may provide a real-time program profiler monitoring execution of different portions of the program on different of the heterogeneous processors to assess data parallelism during an earlier execution of the different portions. The switch unit alternately switches between the heterogeneous processors for a later execution of the different portions of the program based on the assessed degree of data parallelism by the real-time program profiler during the earlier execution of the different portions. Similarly, the profiler may monitor control flow complexity and control flow criticality.

It is thus a feature of at least one embodiment of the invention to manage the complexity of a processor having many similar specialized processors with overlapping capabilities while improving processor performance. Real-time profiling allows program portions to be allocated in a manner that is largely transparent to the user/programmer, rendering the architectural complexity tractable.

The real-time program profiler may monitor data dependencies in the execution of a given portion of the program to assess a degree of data parallelism with larger numbers of dependencies associated with lesser data parallelism. In addition the real-time program profiler may monitor a number of branches in the execution of a given portion of the program to assess the amount of control flow with larger numbers of branches associated with more control flow.

It is thus a feature of at least one embodiment of the invention to provide a simple run time assessment of the amount of data parallelism and control flow complexity.

The architecture may include a general-purpose out-of-order processor providing speculative execution, and only a single one of the heterogeneous processors other than the general-purpose out-of-order processor may execute at a time and the remaining processors other than the general-purpose processor maybe placed in a reduced energy consumption state.

It is thus a feature of at least one embodiment of the invention to largely eliminate the energy penalty of using multiple processors.

The heterogeneous processors may share a same memory and cache from which instructions and data are obtained.

It is thus a feature of at least one embodiment of the invention to provide a limited need for state transfer between processors to allow exploitation of relatively short program portions.

The heterogeneous processors may include a general-purpose processor providing configuration data to other heterogeneous processors before switching to another heterogeneous processor for execution of a program portion.

It is thus a feature of at least one embodiment of the invention to permit highly simplified special-purpose processors that can be assisted in certain functions by a general-purpose processor.

These particular objects and advantages may apply to only some embodiments falling within the claims and thus do not define the scope of the invention.

DETAILED DESCRIPTION OF THE PREFERRED EMBODIMENT

Figure 1:
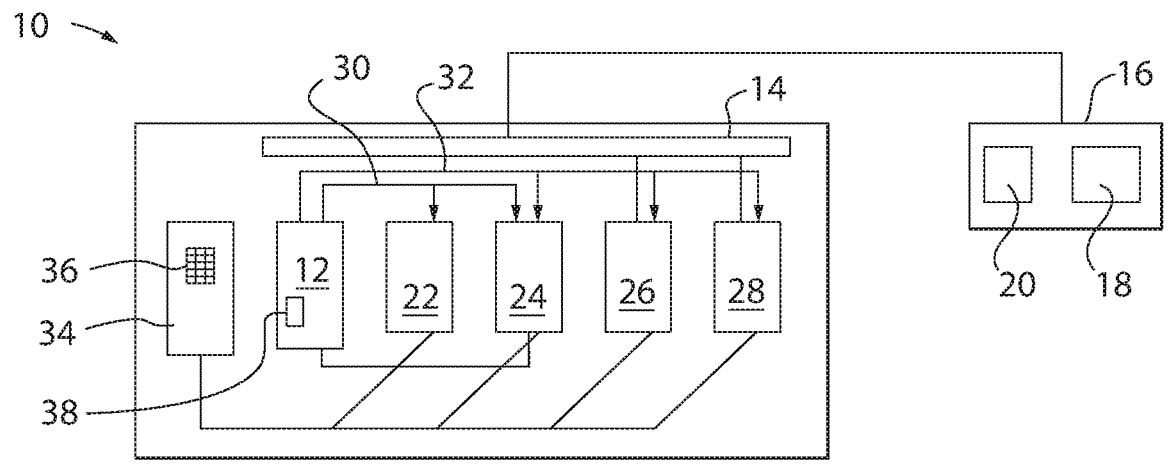
FIG. 1 is a block diagram of a hybrid computer constructed according to the present invention providing a general-purpose processor and four special-purpose processors controlled by a switching unit.

Referring now to FIG. 1, a heterogeneous processor computer 10 may include a general-purpose processor 12, for example, providing for out-of-order (OOO), speculative execution. The general-purpose processor 12 may employ a comprehensive instruction set suitable for execution of general-purpose program types having a wide range of behaviors and coming from a wide range of program domains. The general-purpose processor 12 may nevertheless be limited in performance, for example, to a two-wide OOO processor in contrast to a 6-wide OOO, where two-wide refers to a superscalar processor that can issue two instructions to the pipeline at once.

The general-purpose processor 12 communicates with a cache structure 14 (and memory management unit) allowing access to a main memory 16. The main memory 16 may employ a variety of different technologies including volatile and nonvolatile storage and may hold programs and data including an operating system 18, a compiler for the present heterogeneous processor computer 10, and a general-purpose program 20 for execution.

In addition to the general-purpose processor, the heterogeneous processor computer 10 employs four special-purpose processors including: a short vector, single instruction multiple data processor (SIMD) 22; a data parallel, course-grained reconfigurable architecture processor (DP-CGRA) 24; a non-speculative data flow processor (NS-DF) 26; and a trace-speculative processor (Trace-P) 28. These processors are generally highly specialized and may not be able to execute a full instruction set architecture of the general-purpose processor 12.

The SIMD 22 may be any of a variety of well-known architectures allowing a single instruction to be applied simultaneously to many data elements, the latter provided in the form of a vector from the general-purpose processor 12 over vector line 30 between the general-purpose processor 12 and the SIMD 22. After transfer of the vector, the general-purpose processor 12 provides the instructions to the SIMD 22 that should be applied to the vector and the SIMD 22 performs the necessary calculations and returns the modified vector. The SIMD 22 is suitable only for program portions having a limited amount of control (branches controlled by calculation results), for example, finding application in data parallel loops with little or no control.

The DP-CGRA 24 also provides parallel execution on data but tolerates additional control. An example of a DP-CGRA 24 is the Dyser architecture described by Venkatraman Govindaraju, Chen-Han Ho, Tony Nowatzki, Jatin Chhugani, Nadathur Satish, Karthikeyan Sankaralingam, and Changkyu Kim in "Dyser: Unifying functionality and parallelism specialization for energy efficient computing", IEEE Micro, 2012 and the Morphosys architecture described by H. Singh, Ming-Hau Lee, Guangming Lu, F. J. Kurdahi, N. Bagherzadeh, and E. M. Chaves Filho in: "Morphosys: an integrated reconfigurable system for data-parallel and computation-intensive applications", IEEE Transactions on Computers, 2000, both hereby incorporated by reference. The DP-CGRA 24 is suitable for parallel loops with separable computation and memory access. The DP-CGRA 24 may receive a vector directly from the general-purpose processor 12 over vector line 30 and may receive configuration (implementing instructions) and initialization data from the general-purpose processor 12 over control line 32.

The NS-DF 26 is suitable for program portions that are not data-parallel but still have high potential instruction level parallelism (ILP) where control flow does not lie on a critical path (the long chain of computational instructions that determines the execution time). In this regard the NS-DF 26 may not provide speculative execution to simplify its construction and boost performance for this type of program portion. An example of the NS-DF 26 is the SEED architecture described by Tony Nowatzki, Vinay Gangadhar, and Karthikeyan Sankaralingam in: "Exploring the potential of heterogeneous Von Neumann/Dataflow execution models, in ISCA, 2015, and the Wavescalar architecture described by Steven Swanson, Ken Michelson, Andrew Schwerin, and Mark Oskin in "Wavescalar" in MICRO, pages 291 et seq., 2003, both incorporated by reference. The NS-DF 26 will generally be configured by the general-purpose processor 12 through the configuration lines 32 and then will receive a program counter value to communicate directly through the cache structure 14 to obtain data and program instructions starting at that program counter value when activated.

The Trace-P 28 is suitable for programs that require some speculation where the speculation is highly biased along one "hot path", for example, through a loop. An example Trace-P 28 architecture is described in BERET architecture described by Shantanu Gupta, Shuguang Feng, Amin Ansari, Scott Mahlke, and David August in: "Bundled execution of recurring traces for energy-efficient general purpose processing" in MICRO, 2011, and the CCA architecture described by Nathan Clark, Manjunath Kudlur, Hyunchul Park, Scott Mahlke, and Krisztian Flautner in: "Application-specific processing on a general-purpose core via transparent instruction set customization" in MICRO, 2004, both incorporated by reference. The Trace-P 28 processor will generally be configured by the general-purpose processor 12 and will receive a program counter value over control line 32 and may communicate directly through the cache structure 14 to obtain data and program instructions when activated.

Generally, it will be appreciated that each of the specialized processors SIMD 22, DP-CGRA 24, NS-DF 26, and Trace-P 28 share the same virtual memory system and cache hierarchy (either directly or through the general-purpose processor 12) allowing fast switching between processors without the need to migrate state information. This switching between the general-purpose processor 12 and the specialized processors SIMD 22, DP-CGRA 24, NS-DF 26, and Trace-P 28 is performed by a switch unit 34 communicating with each of the specialized processors SIMD 22, DP-CGRA 24, NS-DF 26, and Trace-P 28 to switch them between an active state in which they may execute instructions and a dormant state providing low power consumption. During the dormant state, the specialized processors SIMD 22, DP-CGRA 24, NS-DF 26, and Trace-P 28 are allowed to lose their architectural state and thus may be essentially shut down completely for zero power consumption. When any of the specialized processors SIMD 22, DP-CGRA 24, NS-DF 26, and Trace-P 28 are operating, the general-purpose processor 12 may be moved to a low-power state but retains architectural state information so that it can be reactivated without loss of state information.

Generally, the switch unit 34 and the general-purpose processor 12 inter-communicate so that the general-purpose processor 12 may properly initialize each of the specialized processors SIMD 22, DP-CGRA 24, NS-DF 26, and Trace-P 28 before it is activated and to receive it and stored data from the SIMD 22, DP-CGRA 24 before they are deactivated.

Figure 6:
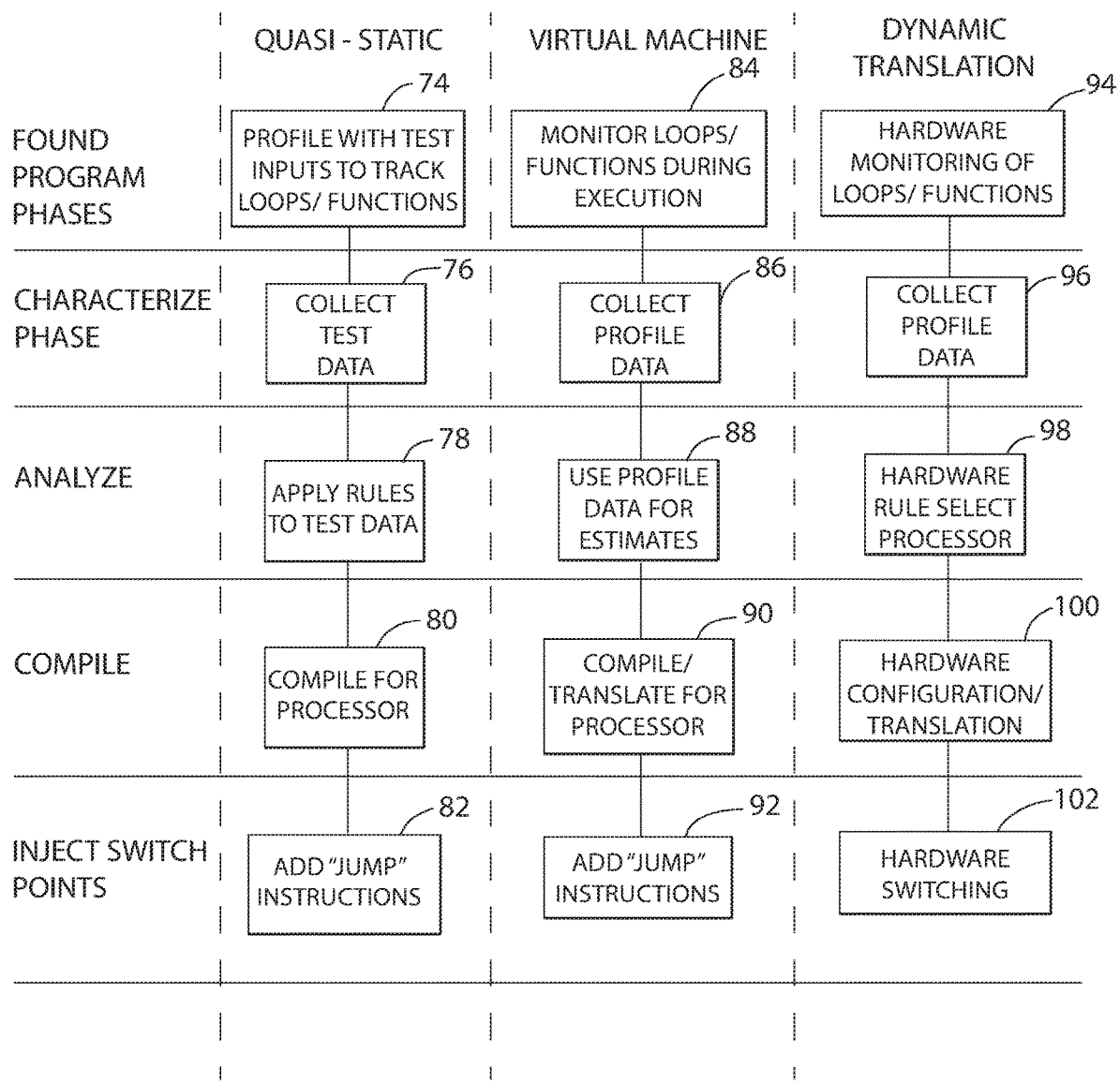
FIG. 6 is a flowchart showing three methods of determining the allocation of program portions to the special purpose processors.

Referring now to FIG. 6, three basic strategies can be used for allocating portions of the program 20 to different ones of the specialized processors SIMD 22, DP-CGRA 24, NS-DF 26, and Trace-P 28 e. All approaches have the same basic steps. The first step is finding program "phases" being regions of the program 20, typically thousands to millions of execution-time instructions, where allocation to a particular one of the specialized processors is indicated. In a second step, the program phases are characterized for example by profiling. Next, in a third step, a combination of program intermediate representation (IR) analysis and/or profiling information is used to predict which specialized processor SIMD 22, DP-CGRA 24, NS-DF 26, and Trace-P 28 will give the highest performance. With that decision made, the fourth step is to compile or interpret the program IR into the architectural interface of the chosen specialized processor (or determine the necessary configuration of the chosen specialized processor[k1][k2][k3]). The fifth step is to inject the invocation of the processor into the program execution of the program 20, so that it can switch on a future activation.

For a quasi-static approach, the phase assignment decisions are made before the execution of the relevant program begins. Program phases may be identified, for example as indicated by process block 74, by profiling the program and tracking the number of instructions executed in loops and functions. Next profiling, per process block 76, may be used to collect information collected from one or several previous executions of the identified program phases, which may use test program inputs and program instrumentation to discover these properties of the program phases. For example, the profiling intbrmation collected may be length of a critical path through the instructions according to the program IR. One prediction technique, then, involves the estimation of execution time of the program phases on a particular specialized processor by formulating this execution time as the length of the critical path through the instructions according to the Program IR, in light of expected instruction execution times and dependences, and microarchitectural constraints unique to the given specialized processor. The specialized processor that has the least execution time estimation (or alternatively energy) would be selected per process block 78. Alternatively, a set of rules and thresholds can be developed based directly on the properties through empirical testing and validation, and these rules may be tuned through statistical techniques like regression. For example, the number of control instructions may measured in the profiling may be applied directly to an empirically derived threshold to decide whether or not execution on the program phase using a SIMD processor would be profitable or not. After a specialized processor is selected, the region of the phase in question would be compiled, per process block 80, for that specialized processor using well known code generation techniques. Finally, special jump instructions would be inserted into the program 20 at the region entry point which would indicate to the switch unit to transfer execution to the selected processor, per process block 82.

A second approach is to employ a virtual machine (e.g., Java), which typically interpret instructions in the virtual machine's instruction set until frequently executed regions are found, then compile them into native code. The virtual machine approach is quite similar to the static approach, except that the compilation decisions are based on profiling during the current execution of the program. Thus at process block 84, loops and functions may be monitored to identify program phases using the virtual machine software. The same process may be used at process block 86 to collect profile data used at process block 88 estimate execution times and select an appropriate specialized processor. Compilation of the program phases for the particular processor may occur at process block 90 and the necessary transition instructions inserted per process block 92.

A final approach is to use hardware-based dynamic translation. Here, hardware mechanisms are used for detecting program phases. In one example, represented by process block 94, retiring instructions linked to particular program counter values can be used to detect program loops and to invoke an analysis of the program portions holding these loops once a certain threshold loop count has been reached. This technique is described, for example in Matthew A. Watkins, Tony Nowatzki, Anthony Carno, "Software transparent dynamic binary translation for coarse-grain reconfigurable architectures", HPCA, 2016, 2016 IEEE International Symposium on High Performance Computer Architecture (HPCA) pp. 138-150. Similar hardware monitoring may be employed to collect data and to determine the best specialized processor to use for each program phase per process block 96 and process block 98. Necessary configuration or translation processes may be incorporated into the architecture of the computer 10 (so that each specialized processor may work with a common instruction set) as indicated by process block 100. For example, hardware may monitor execution of loops or function calls in the pipeline to detect frequently executed regions and may operate (optionally using an additional microprocessor) to compile code to different heterogeneous processors as required. Hardware in the front-end of the general processor pipeline may detect starts of regions and invoke the accelerator.

Figure 4:
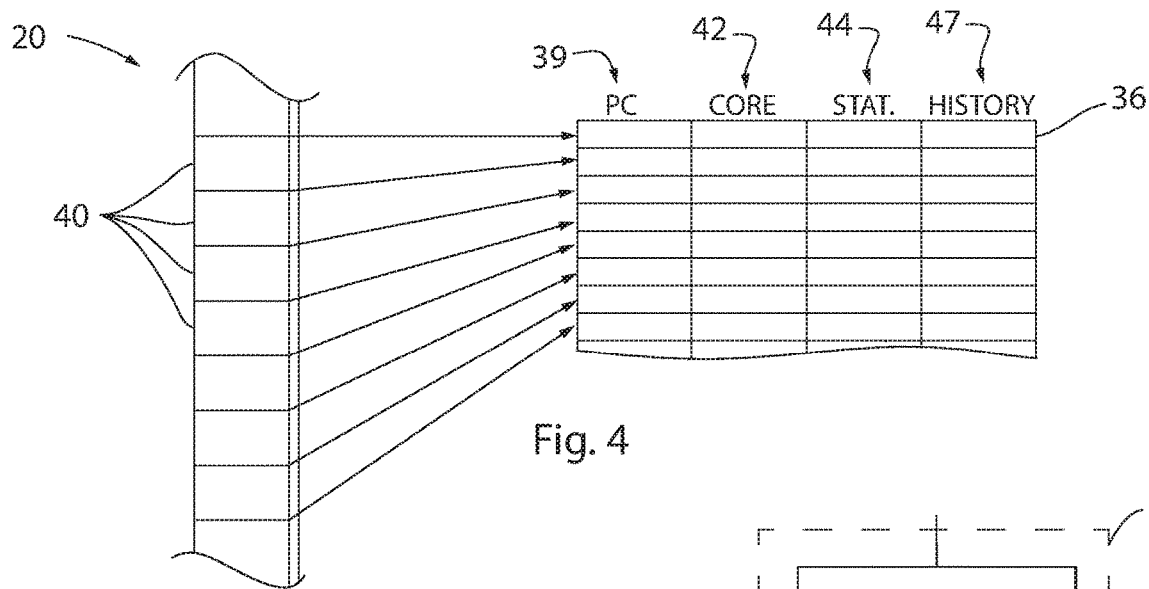
FIG. 4 is a logical representation of a program showing a mapping of data to program counter values to control the switching process of FIG. 3.
Figure 5:
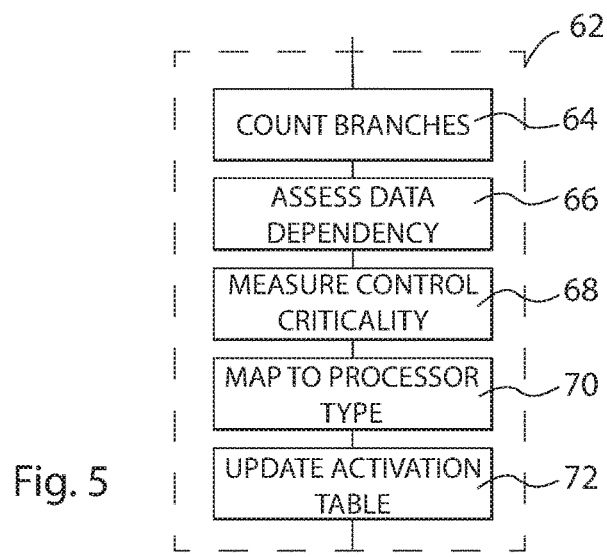
FIG. 5 is a detailed flowchart of a profiling step determining the allocation of special-purpose processors to program portions of FIG. 3.

Finally, as indicated by process block 102, a hardware system may be used to invoke switching between the different specialized processors and the general-purpose processor. This approach will be now described in greater detail below In the dynamic translation embodiment of the invention, the general-purpose processor 12 may manage an activation table 36 controlling the switch unit 34. Referring now to FIG. 4, the activation table 36 may logically provide a table with multiple rows representing portions 40 of the program 20 executed by the heterogeneous processor computer 10, these different portions 40 such as will be assigned to different of the specialized processors SIMD 22, DP-CGRA 24, NS-DF 26, and Trace-P 28. A first column 39 of each row, for example, may hold a program counter value of program 20 demarcating a beginning of a portion 40. The portions 40, for example, may be natural divisions of the program 20 representing loops or function calls within the program 20. In the case of nested loops or nested function calls, the program portions 40 may be the lowest most level of loop and function calls, although the invention contemplates that portions 40 may be combined (for example, all of the loops within a loop) if they tend to have the same affinity to a particular specialized processor.

For each row associated with the program portion 40, a second column 42 will designate a particular core of the specialized processors SIMD 22, DP-CGRA 24, NS-DF 26, and Trace-P 28 or the general-purpose processor 12 which will be activated to execute the instructions of that program portion 40. For this purpose the switch unit 34 may monitor the current program counter of the general-purpose processor 12 or the various specialized cores that have a program counter and switch among the cores appropriately using the guidance of column 42, for example, through the use of an exception type mechanism.

In one embodiment, the particular processor used for a given program portion 40 selected from the specialized processors SIMD 22, DP-CGRA 24, NS-DF 26, and Trace-P 28 and the general-purpose processor 12 may be determined by a real-time profiling process. This process may be implemented by special hardware or performed by the general-purpose processor 12 according to a profiling program 38 executed, for example, as one thread by the general-purpose processor 12. In this profiling process, statistics are collected with respect to the execution of each program portion including current statistics placed in column 44 related to the current processor executing the portion 40 and historical statistics in column 47 that may be optionally used in an AB comparison type process as will be discussed below.

Figure 2:
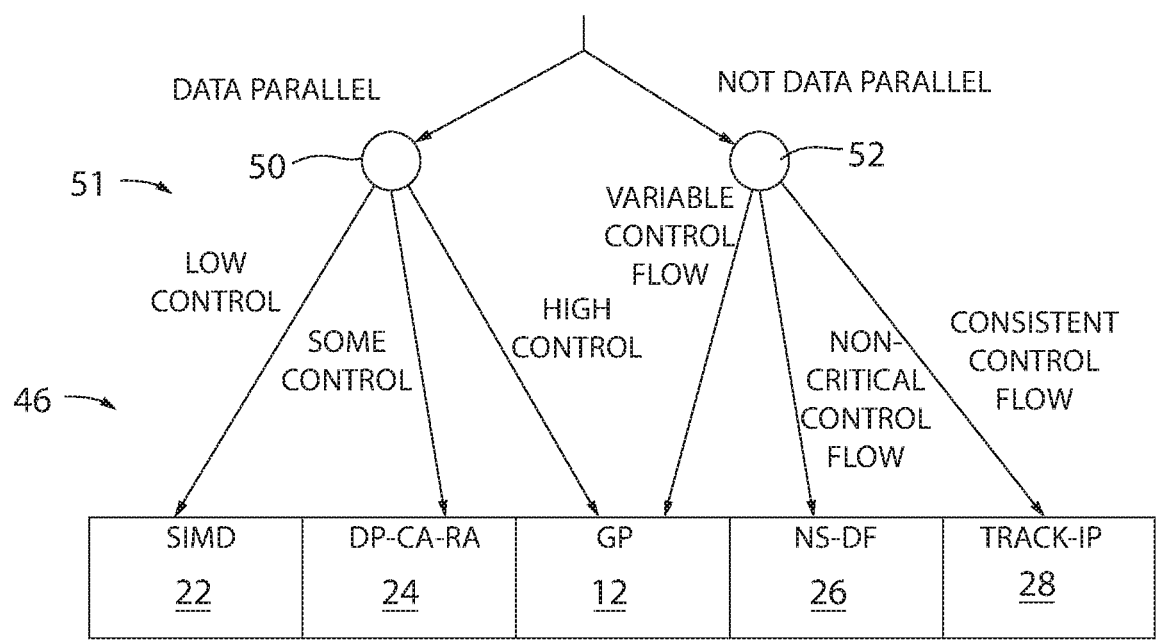
FIG. 2 is a decision tree showing the allocation of program portions to different special-purpose processors.

Referring now to FIG. 2, generally the various specialized processors SIMD 22, DP-CGRA 24, NS-DF 26, and Trace-P 28 are selected to provide for different comparative advantages or affinities 46 in the execution of program portions 40 of particular domains or behavior. Ideally, together, the processors provide affinities that span a substantial portion of a variety of general-purpose programs 20 and which together with the general-purpose processor 12 span the entire domain of most general-purpose programs. A distribution of affinities 46 may be obtained by viewing program portions 40 according to a taxonomy 51 that generally considers data parallelism, control complexity, and characteristics such as control consistency and control criticality.

First, program portions 40 may be separated according to program portion as largely data parallel as indicated by node 50 or not data parallel indicated by node 52. One determination of data parallelism relates to how much data dependency exists between data elements within the program portion 40. Less data dependency between data elements is associated with greater data parallelism. Generally data parallelism refers to the ability to independently operate on the data without data dependency problems. Data dependency, for example, occurs when data elements modified by earlier instructions affect the data read at later instructions (read-after-write dependency) as well as with other combinations of reading and writing of data that could change the results of these operations if order is not preserved. A variety of techniques may be used to assess data dependency including, for example, monitoring a pipeline in the general processor executing the program portion to evaluate dependencies at a time of memory disambiguation. This dynamic or profiling information can be incorporated into analysis of the program IR to determine the total amount and type of data dependency (e.g. loop iteration dependence analysis). If the original program IR is available (in a static compilation approach for example) variable scoping information or operation on distinct data objects may also be used to determine the degree of data parallelism.

For program portions 40 that exhibit a high degree of data parallelism, the program is evaluated with respect to the degree of control complexity, for example, by counting branch instructions. Program portions with high data parallelism and low control complexity are marked in activation table 36 for execution by the SIMD 22. Conversely program portions with high data parallelism and moderate levels of control complexity may be executed by the DP-CGRA 24. Program portions 40 with high data parallelism and high levels of control complexity remain with the general-purpose processor 12.

For program portions 40 that do not provide high levels of data parallelism, as indicated by node 52, in cases where the control flow is relatively consistent (e.g., biased along a single hot path) the program portion is marked for execution by the Trace-P 28. A determination of consistent control flow may be ascertained by monitoring the per-instruction branch directions in a given region over time.

When the control of the program portion 40 is not highly biased but noncritical, meaning that the control flow path is relatively isolated from the critical data flow path, the program portion may be executed by NS-DF 26. The assessment of noncritical control flow maybe by performed with dataflow analysis on the program IR to determine the critical path of instructions (through for example the inner loop of the region) with estimates of instruction latencies and dependence information from profiling. If the control is largely off the estimated critical instruction path, than that would constitute a non-critical control region. Alternatively, a purely hardware approach can be used to find the critical path, as in "Focusing processor policies via Critical Path Prediction" described by Brian Fields, Shai Rubin, and Rastislav Bodik. Again cases where there is little parallel data but highly variable control criticality will be executed by the general-purpose processor 12.

Each of these determinations may be recorded as statistics in column 44 of activation table 36 and then applied to static or dynamically established thresholds to core identification per column 42 of activation table 36 and used to guide the switching between the various specialized processors SIMD 22, DP-CGRA 24, NS-DF 26, and Trace-P 28 and the general-purpose processor 12.

Alternatively or in addition, the switch unit 34 may experiment with the execution of different program portions 40 on different of the specialized processors SIMD 22, DP-CGRA 24, NS-DF 26, and Trace-P 28 versus general-purpose processor 12 to dynamically evaluate which core provides the best performance which may be used to set the core identification of column 42 in activation table 36. Historical statistics obtained from execution on different processors SIMD 22, DP-CGRA 24, NS-DF 26, Trace-P 28 and the general-purpose processor 12 may be stored in column 47 of activation table 36 and used in this comparison process to evaluate the relative advantages of one core versus another core.

Figure 3:
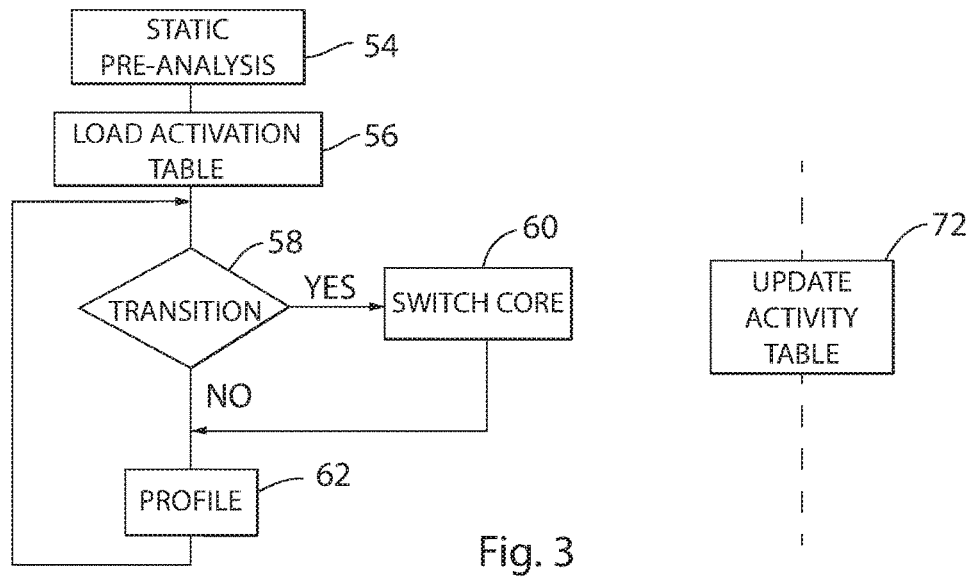
FIG. 3 is a flowchart of the process of switching between the different special-purpose processors during runtime.

Referring now to FIG. 3, use of the heterogeneous processor computer 10 of the present invention may optionally begin with a static analysis of the program 20 indicated by process block 54, for example, attempting to evaluate degrees of data parallelism, control criticality, control complexity and control variability discussed above with respect to FIG. 2 to the extent determinable in static analysis. This analysis may be performed during compilation of the program and may optionally make use of tags embedded in the program identifying preferred processors for use by particular program portions 40. Alternatively, initial selections may be made by the programmer/user or a random initialization may be used. This statically derived information may be used to initialize the activation table 36 as indicated by process block 56 with respect to column 42.

Program execution is then begun and transitions between program portions 40 monitored by switch unit 34 as indicated by process block 58 by monitoring the program counter logically shared by the specialized processors SIMD 22, DP-CGRA 24, NS-DF 26, and Trace-P 28 typically managed by the general-purpose processor 12. At each transition, as indicated by process block 60, the activation table 36 is interrogated to see if a processor different from the currently executing processor should be used. If so, that processor is then activated.

At process block 62 profiling may be conducted (shown as a serial operation but in fact implemented as a background task in parallel), for example, by the switch unit 34 in conjunction with the general-purpose processor 12 executing a profiling program 38.

Referring momentarily to FIG. 4, as discussed briefly above, profiling of process block 62 may, for example, count branches as indicated by process block 64 (to determine control complexity), assess data dependency as indicated by process block 66 (to determine degree of data parallelism), and measure the criticality of control per process block 68 by monitoring intersections of data flow and control flow.

As noted above statistics derived from this profiling may be stored in column 44 of the activation table 36 and analyzed according to a predetermined mapping indicated by process block 70 using the taxonomy 51 of FIG. 2. This mapping process, for example, may establish thresholds applied against the statistics to select edges of the taxonomy of FIG. 2 to identify a particular processor. At process block 72 the results of this analysis are used to update column 42 of the activation table 36.

When an A/B comparison is to be used, statistics for the current processor from column 44 are moved to column 47 and new profiling of a new processor is conducted for a period of time. After completion of that period of time, the statistics of columns 44 and 47 are compared to determine a preferred processor to be identified in column 42.

The concept of improved performance as discussed herein with respect to a computer architecture refers generally to a position of a frontier describing execution speed as a function of energy consumption as a function of chip area in comparison to a similar frontier of a reference architecture.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A computer architecture for executing a program comprising:
   a memory cache hierarchy receiving blocks of data from a memory holding program instructions and program data, the received blocks accessible by memory address;
   a set of heterogeneous processors sharing a same lowest level cache of the memory cache hierarchy allowing architectural state data in the memory cache hierarchy to be shared among the processors by reading a common location of the memory cache hierarchy by different of the set of heterogeneous processors without migration of the state information in the memory cache hierarchy, the set of heterogeneous processors providing relatively different performances with respect to each other, measured in energy consumption and/or speed, with respect to different portions of the program; and
   a switch unit alternately switching between the heterogeneous processors using the architectural state data in the lowest level cache to execute different portions of the program, the switching based on an assessed comparative advantage in performance of each given heterogeneous processor with respect to other of the heterogeneous processors in executing the different portions;
   wherein the heterogeneous processors include:
   (a) a general-purpose processor providing speculative execution and capable of executing the program entirely;
   (b) a first special purpose processor providing higher performance than the general-purpose processor for first given program portions; and
   (c) a second special purpose processor providing higher performance than the general-purpose processor for second given program portions.

2. The computer architecture of claim 1 wherein the first special purpose processor provides higher performance than the general-purpose processor for a first given program portion having a predetermined level of control criticality and the second special purpose processor provides higher performance than the general-purpose processor for a second given program portion exhibiting more control criticality than the first given program portion.

3. The computer architecture of claim 2 wherein the second special purpose processor provides higher performance than the general-purpose processor for the second given program providing a predetermined level of consistency of control flow and wherein the first special purpose processor provides higher performance than the general-purpose processor for the first given program portions exhibiting less control consistency than the second program portion.

4. The computer architecture of claim 3 wherein the second special purpose processor is a trace-speculative processor and the general-purpose processor is a speculative processor.

5. The computer architecture of claim 1 wherein the set of heterogeneous processors includes a specialized processor not providing speculative execution.

6. The computer architecture of claim 1 further including a third special purpose processor providing higher performance than the general-purpose processor for a third program portion having a predetermined level of data parallelism and wherein the first and second special purpose processors provide higher performance than the general-purpose processor for the first and second given programs exhibiting less data parallelism than the third program portion.

7. The computer architecture of claim 6 further including a fourth special purpose processor providing higher performance than the general-purpose processor for a fourth program portion having lower control complexity than the third program portion wherein the fourth special purpose processor provides higher performance than the general-purpose processor for the fourth program portion and the third special purpose processor provides higher performance than the general-purpose processor for the third program portion having greater control complexity than the fourth program portion.

8. The computer architecture of claim 7 wherein the fourth special purpose processor is a processor executing a single instruction in parallel on multiple data elements.

9. The computer architecture of claim 8 wherein the third and fourth special purpose processors are processors accepting a single instruction for execution in parallel on multiple data elements and providing comparative relative advantages on different lengths of data vectors.

10. The computer architecture of claim 1 wherein the general-purpose processor provides configuration data to given other heterogeneous processors before switching to the given other heterogeneous processors for execution of a program portion.

11. The computer architecture of claim 1 wherein the switch unit is controlled by one of the heterogeneous processors.

12. The computer architecture of claim 1 wherein only a single one of the heterogeneous processors other than the general-purpose processor executes at a time and remaining processors other than the general-purpose processor are placed in a reduced energy consumption state.

13. The computer architecture of claim 1 wherein the general-purpose processor is an out-of-order processor.

14. The computer architecture of claim 1 further including:
   a real-time program profiler monitoring execution of different portions of the program on different of the processors to assess comparative advantages of the different processors in executing the different portions during an earlier execution of the different portions; and
   wherein the switch unit alternately switches between the processors for a later execution of the different portions of the program based on the assessed comparative advantage as indicated by the real-time program profiler during the earlier execution of the different portions.

15. The computer architecture of claim 14 wherein the real-time program profiler monitors execution of a given portion of the program to assess a degree of control criticality.

16. The computer architecture of claim 14 wherein the real-time program profiler monitors data dependencies in the execution of a given portion of the program to assess a degree of data parallelism with larger numbers of dependencies associated with lesser data parallelism.

17. The computer architecture of claim 14 wherein the real-time program profiler monitors a number of branches in the execution of a given portion of the program to assess control flow complexity with larger numbers of branches associated with more control flow complexity.

18. The computer architecture of claim 14 wherein the real-time program profiler is executed at least in part on one of the heterogeneous processors.

19. A method of executing a program on a computer architecture having:
- a memory cache hierarchy receiving blocks of data from a memory holding program instructions and program data, the received blocks accessible by memory address;
- a set of heterogeneous processors sharing a same lowest level cache of the memory cache hierarchy allowing architectural state data in the memory cache hierarchy to be shared among the processors by reading a common location of the memory cache hierarchy by different of the set of heterogeneous processors without migration of the state information in the cache hierarchy, the heterogeneous processors providing relatively different performances with respect to each other, measured in energy consumption and/or speed, with respect to different portions of the program; and
- a switch unit alternately switching between the heterogeneous processors using the architectural state data in the lowest level cache to execute different portions of the program, the switching based on an assessed comparative advantage in performance of each given heterogeneous processor with respect to other of the heterogeneous processors in executing the different portions;

wherein the heterogeneous processors include:
- (a) a general-purpose processor providing speculative execution and capable of executing the program entirely;
- (b) a first special purpose processor providing higher performance than the general-purpose processor for first given program portions; and
- (c) a second special purpose processor providing higher performance than the general-purpose processor for second given program portions; the method comprising the steps of:
- (a) allocating program portions to different of the heterogeneous processors according to a first allocation pattern;
- (b) profiling the allocated program portions during execution on the heterogeneous processors according to the first allocation pattern; and
- (c) based on the prattling, reallocate the program portions to the different heterogeneous processors according to a second allocation pattern providing improved performance.

* * * * *